United States Patent
Sato et al.

(10) Patent No.: US 8,482,656 B2
(45) Date of Patent: Jul. 9, 2013

(54) APPARATUS FOR DETECTING IN-FOCUS STATE

(75) Inventors: Koichi Sato, Saitama (JP); Masahiro Kawasaki, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 208 days.

(21) Appl. No.: 12/949,065

(22) Filed: Nov. 18, 2010

(65) Prior Publication Data

US 2011/0122280 A1  May 26, 2011

(30) Foreign Application Priority Data

Nov. 20, 2009  (JP) .................................. 2009-265195

(51) Int. Cl.
- *H04N 5/232* (2006.01)
- *H04N 5/235* (2006.01)
- *H04N 3/14* (2006.01)
- *G03B 3/00* (2006.01)

(52) U.S. Cl.
USPC ........... 348/345; 348/222.1; 348/297; 396/96

(58) Field of Classification Search
USPC ................ 348/207.99, 208.12, 222.1, 294, 348/295, 296, 297, 345, 346, 347, 348, 349, 348/350, 351, 352, 353, 354, 355, 356; 396/89, 396/96, 121
See application file for complete search history.

(56) References Cited

U.S. PATENT DOCUMENTS

| | | | |
|---|---|---|---|
| 4,698,515 A * | 10/1987 | Sepai ............................ 348/316 |
| 4,791,446 A | 12/1988 | Ishida et al. | |
| 4,876,603 A | 10/1989 | Suzuki et al. | |
| 5,485,002 A | 1/1996 | Kusaka | |
| 5,900,927 A | 5/1999 | Hasegawa | |
| 6,198,506 B1 * | 3/2001 | Nakata et al. ............... 348/222.1 |

(Continued)

FOREIGN PATENT DOCUMENTS

| | | |
|---|---|---|
| JP | 62-259022 | 11/1987 |
| JP | 63-238771 | 10/1988 |

(Continued)

OTHER PUBLICATIONS

U.S. Appl. No. 12/949,040 to Hoya Corporation, Which was filed Nov. 18, 2010.

(Continued)

*Primary Examiner* — Chieh M Fan
*Assistant Examiner* — Peter Chon
(74) *Attorney, Agent, or Firm* — Greenblum & Bernstein, P.L.C.

(57) ABSTRACT

An apparatus that detects an in-focus state according to the present invention has a plurality of line sensors arranged on a projection area of an optical image-forming system; a plurality of monitor sensors arranged on the projection area with each monitor sensor positioned adjacent to a corresponding line sensor and monitoring a quantity of light incident on the corresponding line sensor; an electric charge accumulation controller that controls the timing of completion of the accumulation of electric charges in the plurality of line sensors on the basis of monitor signals output from corresponding monitor sensors; that controls the timing of the commencement of the subsequent accumulation of electric charges in the plurality of line sensors; and a signal output processor that reads the accumulated electric charges from the plurality of line sensors and then outputs image signals corresponding to an object image. The electric charge accumulation controller commences accumulation of electric charges before the reading of all electric charges in the plurality of line sensors finishes.

9 Claims, 10 Drawing Sheets

U.S. PATENT DOCUMENTS 6,937,818 B2 * 8/2005 Nakata et al. .................. 396/96
7,460,779 B2 * 12/2008 Nakata ............................ 396/96
7,493,034 B2 * 2/2009 Nakata ............................ 396/96

FOREIGN PATENT DOCUMENTS

| JP | 7-11044 | 4/1995 |
| JP | 10-068872 | 3/1998 |
| JP | 2002-107614 | 4/2002 |
| JP | 2004-272238 | 9/2004 |
| JP | 2006-145792 | 6/2006 |

OTHER PUBLICATIONS

Japan Office action, mail date is May 14, 2013.

* cited by examiner

APPARATUS FOR DETECTING IN-FOCUS STATE

BACKGROUND OF THE INVENTION

1. Field of the Invention

The present invention relates to a camera with an AF (Auto Focus) mechanism using a phase-difference method, such as an SRL (single-reflex lens) camera. In particular, it relates to a control for a series of line sensors.

2. Description of the Related Art

An SRL-type camera is equipped with an AF mechanism based on a phase-difference method, which has an optical image-forming system and a sensor module that is constructed from a focus-detection device, such as an IC chip. The optical image-forming system has a separator lens and a condenser lens, whereas the focus-detection device is equipped with a series of line sensors that are arrayed within a projection area of the optical system. Each line sensor has a plurality of pairs of photodiodes.

In an AF sensor, an optical system divides a ray bundle from an object into two ray bundles to project a pair of images onto the pairs of line-sensors. Each line sensor outputs image-pixel signals by photoelectric conversion, and a difference between the positions of the two images, namely a phase difference, is detected. The difference represents an out-of-focus magnitude. Whether or not an object is in focus can be determined by the detected out-of-focus magnitude. When the object is out of focus, a length of movement and shift in the direction of the focusing lens are determined. Then, the focusing lens is driven.

Generally, a line sensor is an electric charge storage/accumulation-type sensor, and an accumulation period is adjusted on the basis of a monitor sensor that is arrayed alongside the line sensor. For example, U.S. Pat. No. 7,493,034, U.S. Pat. No. 6,937,818 and U.S. Pat. No. 4,876,603 each discloses the adjustment of an accumulation of electric charges using a monitor sensor. A monitor sensor, which has a photo-electric converter such as photodiodes, continuously detects the intensity of light and outputs monitor signals in order to prevent the target line sensor from receiving a light quantity in excess of a dynamic range, which would cause electric charges to overflow from the line sensor. The amount of light that each line sensor receives varies according to the brightness distribution of an object. Therefore, a charge-accumulation period is controlled independently for each line sensor.

A monitor signal level is compared with a predetermined threshold level during the accumulation of electric charges. When a monitor signal exceeds a predetermined threshold value, a corresponding line sensor stops the accumulation of electric charges by opening a transfer gate, and accumulated electric charges are temporarily stored in a memory (e.g., a capacitor) of the line sensor. After the accumulation of electric charges in all of the line sensors is completed, a series of image-pixel signals that correspond to image signals of an object are output from the line sensors. At this time, the series of image-pixel signals are subjected to a noise reduction process and converted to digital signals. The output digital image signals are used for calculating an out-of-focus parameter. A focusing lens is then driven by an amount equal to the value of the out-of-focus parameter. The output of image signals is repeatedly continued until an object image is brought into focus.

While reading accumulated electric charges from a line sensor, electric charges that are generated in photodiodes by incident light are cleared away so that no new electric charges accumulate in the line sensor. Namely, an accumulation of electric charges and the reading of accumulated electric charges are carried out independently, and in order. Therefore, when the length of a period for reading accumulated electric charges increases due to the brightness of a target object (e.g., a dark object), it takes a long time to focus on the object.

SUMMARY OF THE INVENTION

An object of the present invention is to provide a focus-detection apparatus that is capable of rapidly detecting whether an object image is in-focus regardless of the brightness level of the object.

An apparatus that detects an in-focus state according to the present invention has a plurality of line sensors arranged on a projection area of an optical image-forming system; a plurality of monitor sensors arranged on the projection area with each monitor sensor positioned adjacent to a corresponding line sensor and monitoring a quantity of light incident on the corresponding line sensor; an electric charge accumulation controller that controls both the completion timing of an accumulation of electric charges in the plurality of line sensors on the basis of a monitor signal output from a corresponding monitor sensor and the start timing of a subsequent accumulation of electric charges in the plurality of line sensors; and a signal output processor that reads the accumulated electric charges from the plurality of line sensors and outputs image signals corresponding to an object image. The electric charge accumulation controller starts the accumulation of electric charges before the reading of all electric charges in the plurality of line sensors is finished.

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENTS

Hereinafter, the preferred embodiment of the present invention is described with reference to the attached drawings.

Figure 1:
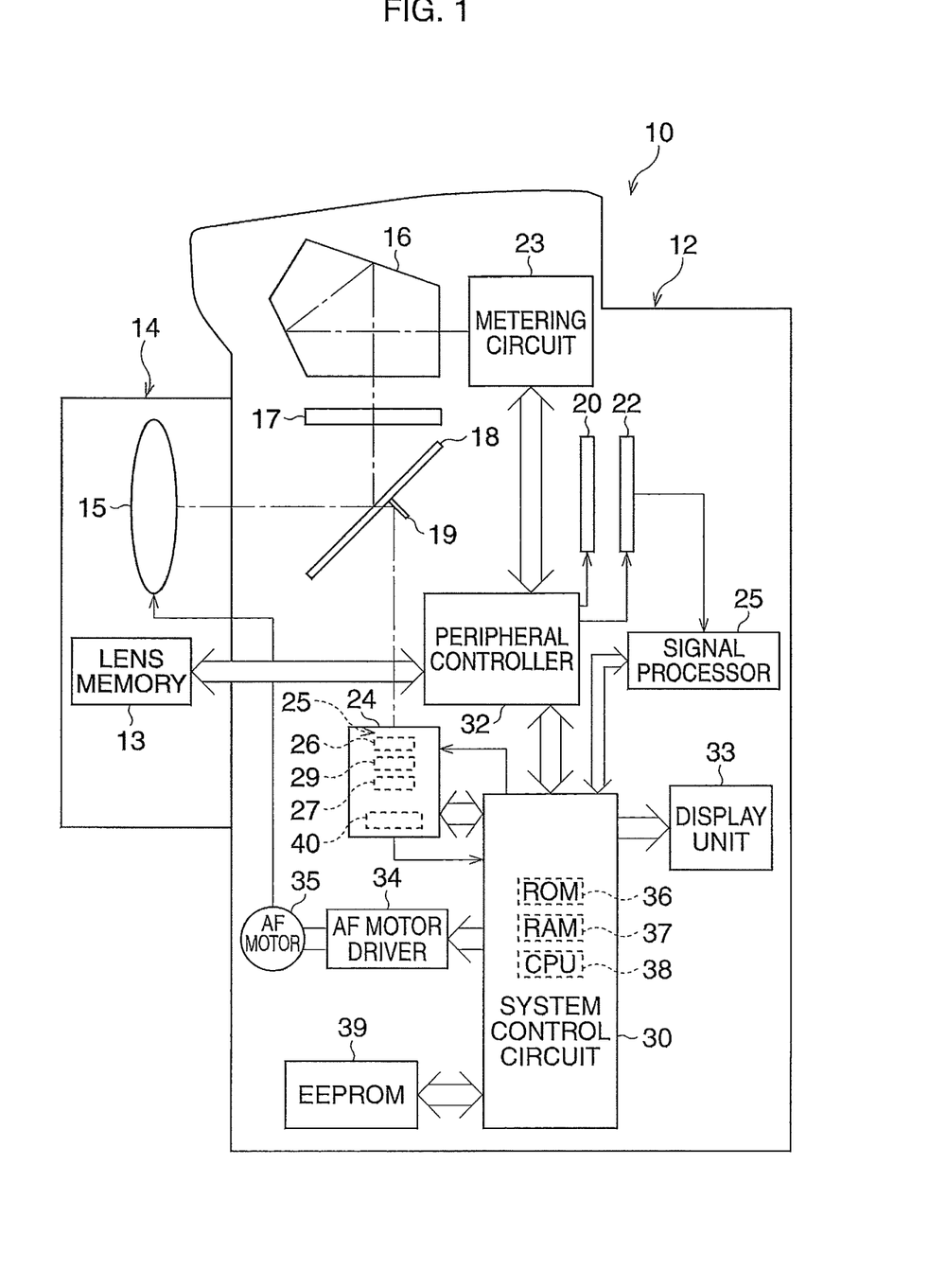
FIG. 1 is a schematic diagram of the inner construction of a digital camera according to the embodiment.

FIG. 1 is a schematic diagram of the inner construction of a digital camera according to the embodiment.

The SLR-type digital camera 10 is equipped with a body 12 and an interchangeable lens 14 removably attached to the body 12. The body 12 has a pentaprism 16, a quick return mirror 18, a focal plane shutter 20, and an image sensor 22 (e.g., a CCD or CMOS image sensor).

A metering circuit 23 is arranged adjacent to the pentaprism 16, and detects the brightness of an object image formed by a pint glass 17 disposed above the quick return mirror 18, in accordance with a TTL metering method. An AF module 24, which is disposed below the quick return mirror 18, detects a focus state in accordance with a phase-difference method.

A system control circuit 30 having a ROM unit 36, a RAM unit 37, and a CPU 38 controls the operation of the camera 10 and outputs control signals to the metering circuit 23, the AF module 24, a peripheral controller 32, a display unit 34, and EEPROM 39, etc. The peripheral controller 32 controls an exposure mechanism including the focal plane shutter 20, an iris (not shown), and the image sensor 22. Also, the peripheral controller 32 obtains lens information from a lens memory 13 in the interchangeable lens 14.

When the camera 10 is powered ON a photographing mode is activated. Light passing through a photographing optical system 15 is directed to the pentaprism 16 via the quick return mirror 18. A user confirms an object through a viewfinder (not shown). When a release button (not shown) is depressed halfway, the metering circuit 23 detects the brightness of the object image and the AF module 24 detects an in-focus state.

A portion of the light passing through the photographing optical system 15 passes through the quick return mirror 18 and proceeds to the AM module 24 via a sub-mirror 19. The AF module 24 has an optical image-forming system 25 including a condenser lens 26, a separator lens 27, a separator mask 29, and a focal detector 40. The separator mask 29 is arranged on a conjugate surface equivalent to an image-forming surface (i.e., a photo-receiving surface of the image sensor 22), and divides an object image into two pairs of images. The separator lens 27 forms the two pairs of images on a photo-receiving surface of the AF module 24. Herein, the two pairs of images are perpendicular to each other. The focus detector 40 outputs image signals of the projected object images to the system control circuit 30.

The system control circuit 30 calculates an out-of-focus magnitude and carries out a focus-adjustment process. Concretely, the system control circuit 30 outputs control signals to an AF motor driver 34 based on the out-of-focus magnitude and out-of-focus direction. The AF motor 35 repositions a focusing lens in the photographing optical system 15 on the basis of driving signals supplied by the AF motor driver 34. The focus detection and lens-driving processes are both carried out until an object image is in focus. After the AF adjustment and brightness detection processes are carried out, the system control circuit 30 calculates exposure values, i.e., a shutter speed and an F number.

Then, when the release button is fully depressed, a series of recording processes are carried out. Concretely, an object target image is formed on the image sensor 22 by the motions of the quick return mirror 18, the iris and the shutter 20, and then one frame's worth of image-pixel signals are read from the image sensor 22. A signal processor 25 generates digital image data from the read image-pixel signals. The generated image data is stored in a memory (not shown) such as a memory card.

Figure 2:
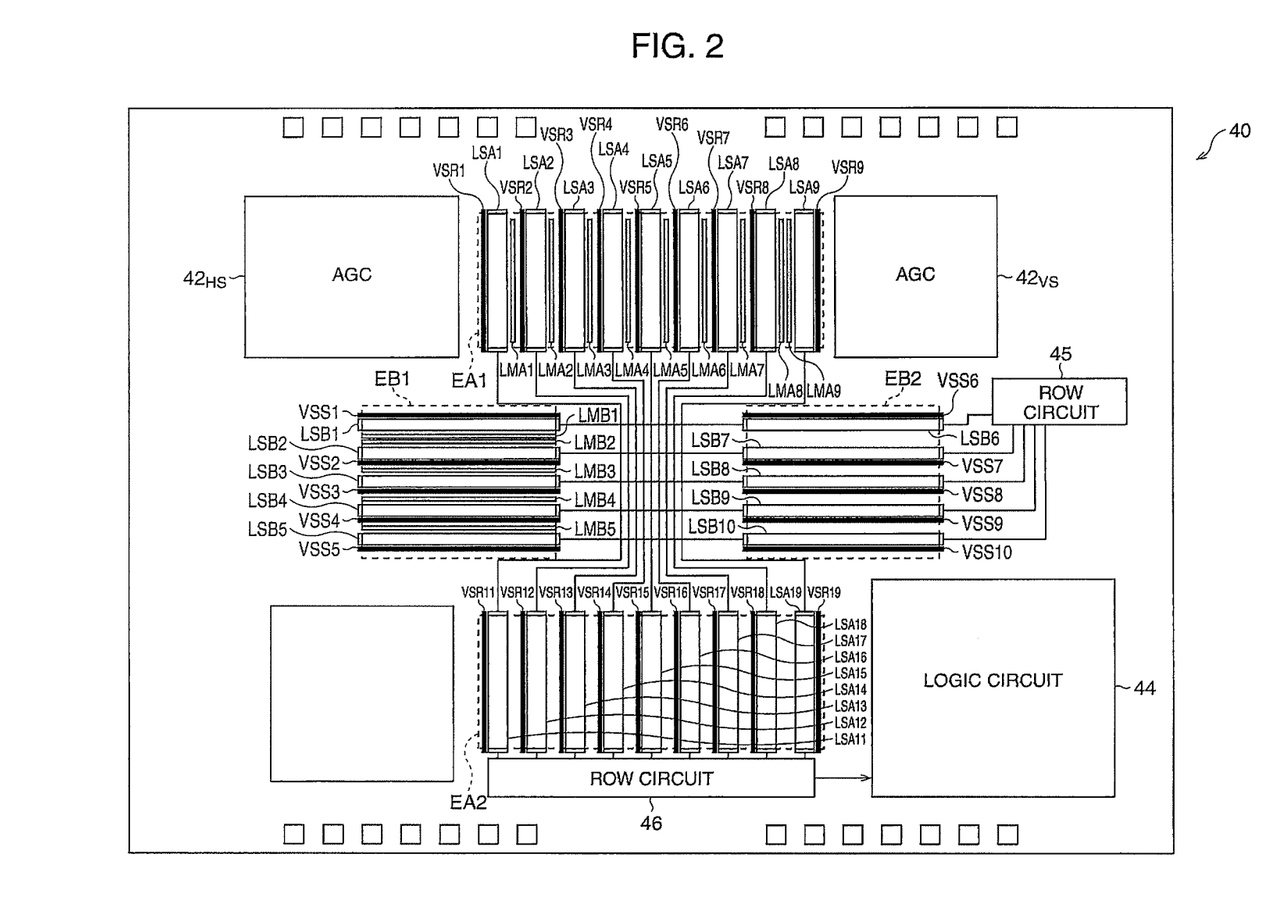
FIG. 2 is a view showing an arrangement construction of the focus detector.

FIG. 2 illustrates an arrangement construction of the focus detector.

The focus detector 40 is constructed from an IC (Integrated Circuit) chip on which a plurality of CMOS-type line sensors is arranged. On the surface of the focus detector 40, a pair of line-sensor groups EA1 and EA2 is disposed so as to be opposite from each other along the vertical direction of the photo-receiving surface, and a pair of line-sensor groups EB1 and EB2 is disposed so as to be opposite from each other along the horizontal direction. Note that the vertical direction corresponds to the vertical direction of the photographed object image, and the horizontal direction corresponds to the horizontal direction of the object image. The line-sensor groups EA1 and EA2 and the line-sensor groups EB1 and EB2 surround the center portion of the detector's surface.

One pair of object images obtained from pupil division by the optical image-forming system 25 is projected onto the areas in which the line-sensor groups EA1 and EA2 are disposed, and the other pair of object images is projected onto areas in which the line-sensor groups EB1 and EB2 are disposed.

Each line-sensor group is composed of a plurality of line sensors arrayed along the horizontal (left-right) direction or vertical (upper-lower) direction at predetermined intervals. The line-sensor groups EA1 and EA2 are arrayed along the left-right direction, whereas line-sensor groups EB1 and EB2 are arrayed along the upper-lower direction. Each line-sensor has a plurality of photo-converters (herein, photodiodes) arrayed in a line.

The line-sensor group EA1 is composed of nine line sensors LSA1-LSA9, with each line sensor functioning as a standard line sensor. On the other hand, each one of the nine line sensors LSA11-LSA19 in the line-sensor group EA2 functions as a reference line sensor. Similarly, each one of the five line sensors from LSB1 to LSB5 functions as a standard line sensor, while each one of the five line sensors from LSB6 to LSB10 functions as a reference line sensor.

For the line-sensor groups EA1 and EB1, monitor sensors from LMA1 to LMA9 and from LMB1 to LMB5 are disposed alongside the line sensors from LSA1 to LSA9 and from LSB1 to LSB5, respectively. Each monitor sensor is composed of a plurality of photodiodes that divides the area of the neighboring line sensor into multiple sections. Each of the monitor sensors from LMA1 to LMA9 extends along the longitudinal direction, namely, alongside a neighboring line sensor, and outputs a "monitor signal" representing a quantity of light (intensity of light). Similarly, each monitor sensor from LMB1 to LMB5 also outputs a monitor signal.

Furthermore, vertical shift registers VSR1-VSR9 and VSS1-VSS5 are arranged adjacent to line sensors LSA1-LSA9 and LSB1-LSB5, respectively. Similarly, vertical shift registers VSR11-VSR19 and VSS6-VSS10 are arranged adjacent to line sensors LSA11-LSA19 and LSB6-LSB10, respectively. Also, a series of black level monitoring sensors (not shown) are arranged adjacent to the line sensors in line-sensor groups EA1 and EB1.

AGC (Auto Gain Control) circuits $42_{HS}$ and $42_{VS}$ adjust the gains of monitor signals received from the monitor sensors LMA1-LMA9 and LMB1-LMB5. Furthermore AGC circuits $42_{HS}$ and $42_{VS}$ compares the values of the monitor signals with a threshold value. Each AGC circuit determines whether a quantity of light incident on a target line sensor is sufficient for detecting an in-focus state. The threshold value is predetermined so as to prevent an overflow of light exceeding the dynamic range of a line sensor.

When the monitor signal exceeds or reaches the threshold value, the quantity of light incident on it is determined to be sufficient for detecting the in-focus state. Each AGC circuit outputs a monitor signal that indicates the termination of an accumulation of an electric charge to a logic circuit 44 (hereinafter, called a "termination signal"). The logic circuit 44 outputs a control signal for terminating the accumulation to the target line sensor. Consequently, the accumulation (integration) of electric charges by the target line sensor stops and the accumulated electric charges are temporarily stored in the line sensor.

As described later, an accumulation period of electric charges is controlled for a plurality of target areas that is defined on each line sensor. Therefore, the timing of the completion of the accumulation of electric charges varies with each line sensor's target area. Once the accumulation of electric charges is finished for all of the line sensors, the electric charges accumulated in each line sensor are output to the system control circuit 30, in order, by an image-pixel reading circuit (herein, not shown); the vertical shift registers VSR1-VSR9, VSR11-VSR19, VSS1-VSS5 and VSS6-VSS10; and by the output electric charge transfer circuits 45 and 46 that include horizontal shift registers (hereinafter, called a "row circuit"). In the row circuits 45 and 46, a noise reduction process and an amplifying process is carried out on the read image-pixel signals. The amplified image-pixel signals are output to the system control circuit 30 shown in FIG. 1. In the system control circuit 30, an out-of-focus magnitude is obtained from the phase difference between the pairs of image-pixel signals.

Hereinafter, a control of the accumulation of electric charges and a method for reading image-pixel signals are explained with reference to FIGS. 3-5.

Figure 3:
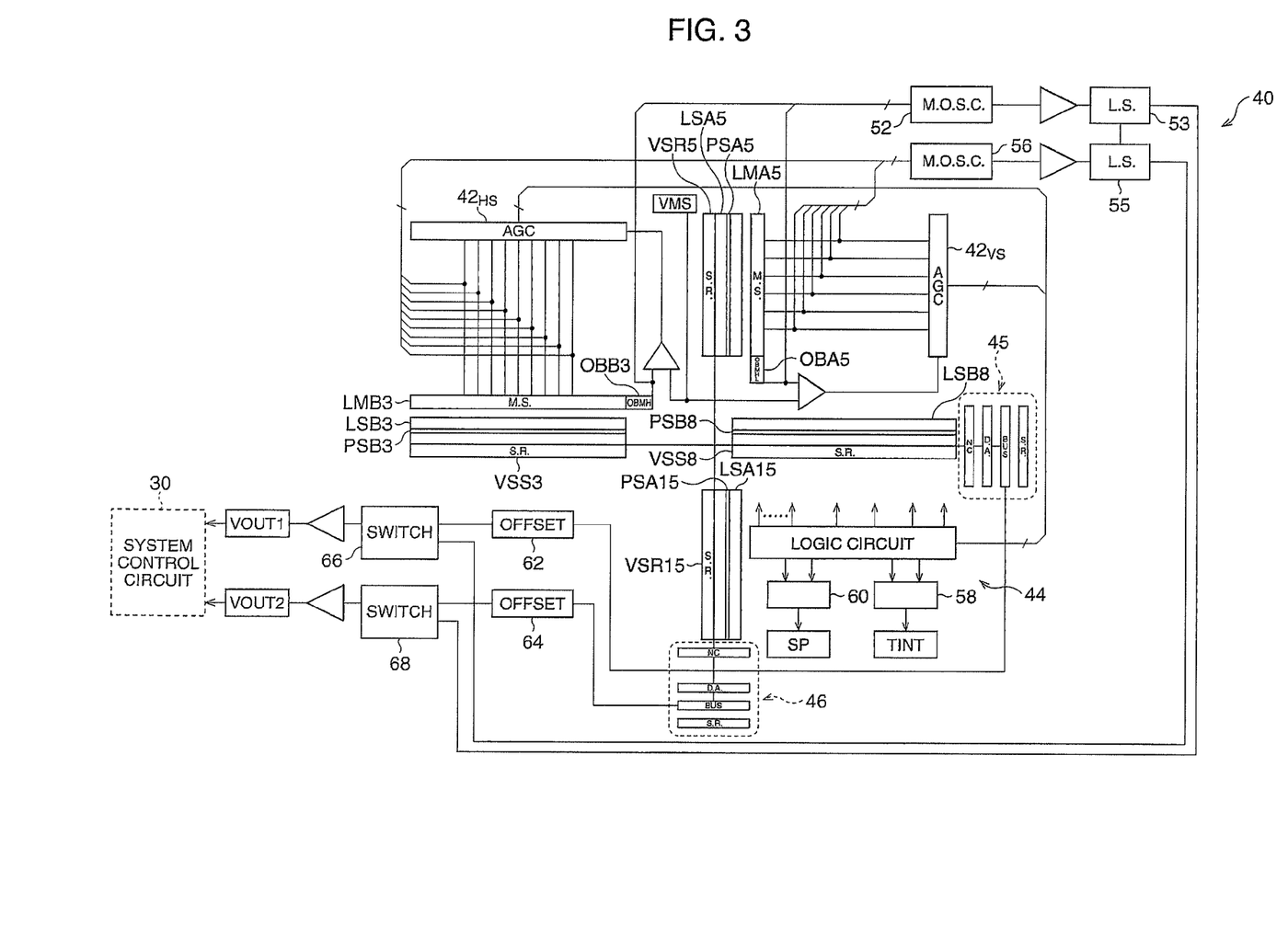
FIG. 3 is a block diagram of the focus detector.

FIG. 3 is a block diagram of the focus detector 40. FIG. 4 is diagram of a control for the accumulation of electric charges. And FIG. 5 is a schematic diagram of a process for scanning or reading image-pixel signals.

Note that FIG. 3 illustrates only the pair of line sensors LSA5 and LSA15 along the vertical direction, the pair of line sensors LSB3 and LSB8 along the horizontal direction, and the corresponding monitor sensors LMA5 and LMB3. The other line sensors and monitor sensors have been omitted.

The line sensor LSA5 shown in FIG. 3 has a series of pairs of photodiodes aligned in the vertical direction. The image-pixel signal circuit PSA5 aligned in the vertical direction is intervening between the series of pairs of photodiodes. Similarly, the line sensors LSA15, LSB3, and LSB8 have a series of pairs of photodiodes, respectively, and the image-pixel reading circuits PSA15, PSB3, and PSB8 are arranged between the series of pairs of photodiodes, respectively. Electric charges accumulated in each pair of photodiodes are read by a corresponding image-pixel signal circuit as "image-pixel signals".

The monitor sensor LMA 5 arranged alongside the line sensor LSA5 is constructed of a plurality of fine photosensors (herein, not shown), which is aligned in the vertical direction. Each fine photosensor is equipped with a photoelectric converter (e.g., photodiode). Electric charges accumulated in the fine photosensor are read by an image-pixel reading circuit (herein, not shown). The monitor sensor LMB3 next to the line sensor LSB3 has a series of fine photosensors, similarly to the monitor sensor LMA5.

A series of monitor signals output from the monitor sensor LMB3 are input to the AGC circuit $42_{HS}$. As mentioned before, the AGC circuit $42_{HS}$ detects whether the monitor signal levels exceed the threshold level. When the value of a monitor signal exceeds the threshold level, a termination signal that indicates an excess or arrival with respect to the threshold level is output to the logic circuit 44. The threshold level is predetermined in accordance with the dynamic range of the line sensor LSB3. The AGC circuit $42_{VS}$ connected to the monitor sensor LMA5 detects whether monitor signals from the monitor sensor LMA5 exceed the threshold level, similarly to the AGC $42_{HS}$.

Figure 4:
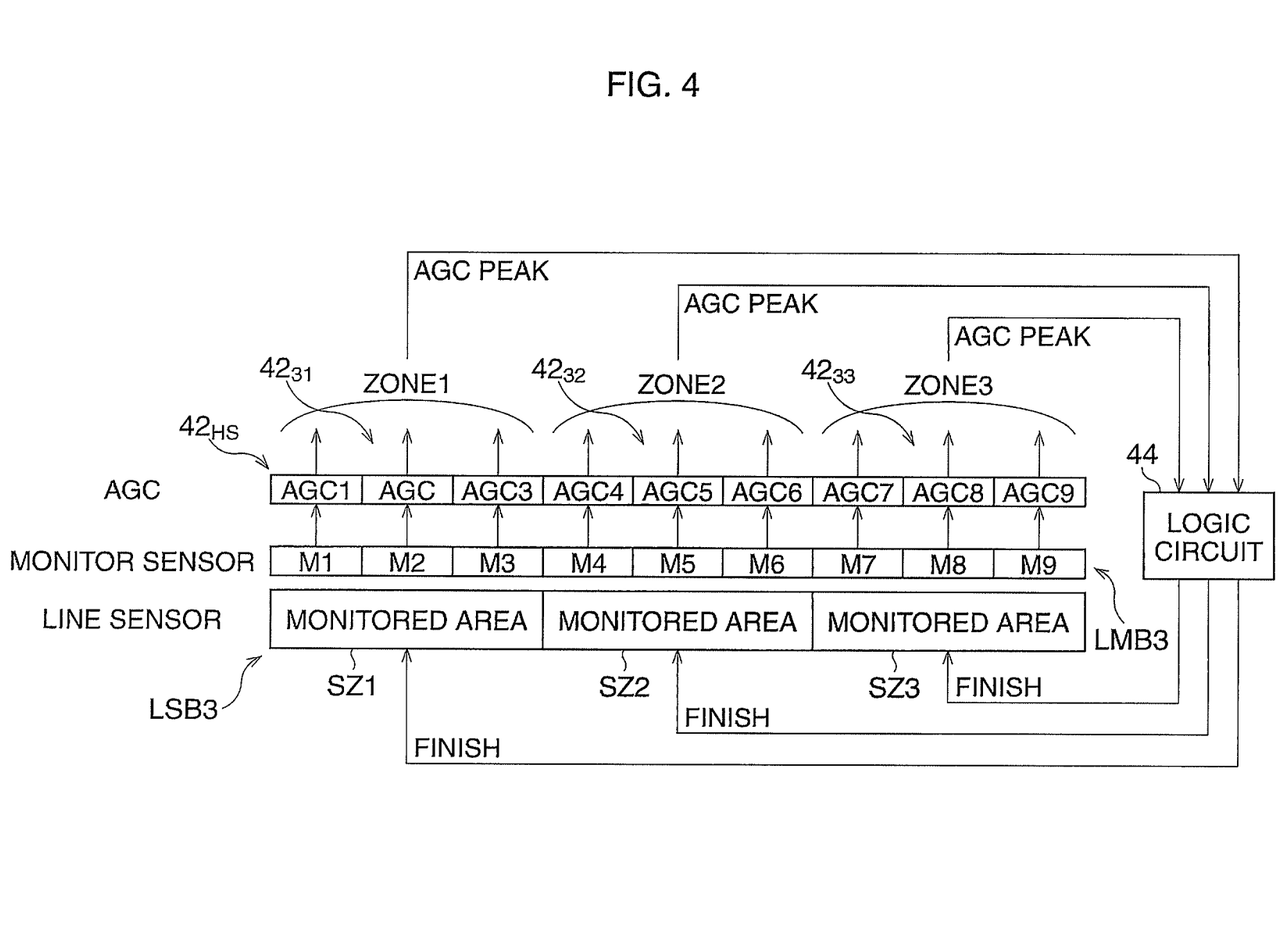
FIG. 4 is a view showing a control of an accumulation of electric charges.

In FIG. 4, the line sensor LSB3 and the monitor sensor LMB3 are shown. The monitoring of the line sensors is carried out for a plurality of partial areas, i.e., distance-measuring zones that are defined over the total area of the line sensors. The actual series of distance-measuring zones are defined as shown in FIG. 5; however, three distance-measuring zones SZ1-SZ3 are defined in FIG. 4 for explanation purposes. Accordingly, a series of three fine photosensors M1-M3, M4-M6, and M7-M9, which monitors the line sensor's partial areas SZ1, SZ2, and SZ3, respectively, is defined. Each fine photosensor receives light that is substantially the same as the light incident on photodiodes in an opposite target area.

The AGC circuit $42_{HS}$ has three sections $42_{31}$, $42_{32}$, and $42_{33}$, which corresponds to the zones 1 to 3, respectively. The sections $42_{31}$, $42_{32}$, and $42_{33}$ have AGC circuit elements AGC1-AGC3, AGC4-AGC6, and AGC7-AGC9, respectively, which are connected to the three fine photosensors M1-M3, M4-M6, and M7-M9, respectively. The threshold value for light incident on the three fine photosensors in one distance-measuring zone is set to the same value. Then, a different threshold value is set in each distance-measuring zone. For example, the same threshold value is set to the AGC circuit elements AGC1-AGC3. On the other hand, the threshold values for sections $42_{31}$ and $42_{32}$ are different from each other.

The timing of the completion of the accumulation of electric charges is determined in each distance-measuring zone. In the case of the distance-measuring zone 1, the accumulation of electric charges in the area SZ1 starts when a pair of object images is projected onto the focus detector's surface. Since the amount of light incident on each fine photosensor is different in accordance with the brightness distribution of an object, the output timing of the termination signal is different for each fine photosensor.

For example, when relatively strong light is incident on the fine photosensor M1 and relatively weak light is incident on the fine photosensors M2 and M3, the voltage level of the monitor signal input to the AGC1 reaches the threshold level earlier than the fine photosensors M2 and M3, and outputs a termination signal to the logic circuit 44 earlier. The logic circuit 44 terminates the accumulation of electric charges for the partial area SZ1 in response to the termination signal. Electric charges accumulated in the partial area SZ1 are temporarily stored in capacitors (herein, not shown). Similarly, when the AGC2 or AGC3 outputs the termination signal first, the accumulation of electric charges in the partial area SZ1 is terminated. Such an accumulation of electric charges is similarly carried out in the partial area SZ2 and SZ3. Such control of the accumulation of electric charges is carried out for each partial area on the line sensors LSA1-LSA9 and LSB1-LSB5 shown in FIG. 2.

In the accumulation of electric charges for all of the line sensors, a series of image-pixel signals is output from each line sensor. On the other hand, when the accumulation of electric charges in some partial areas is not finished within a predetermined amount of time from the point when the accumulation of electric charges commences, the accumulation in those areas is competed though an amount of light does not reaches the threshold level. Image-pixel signals generated in the line sensor groups EA1 and EA2, which are located in the upper and low areas (see FIG. 2), are transferred to the row-circuit 46, whereas image-pixel signals generated in the line sensor groups EB1 and EB2, which are located in the left and right areas, are transferred to the row-circuit 45.

Figure 5:
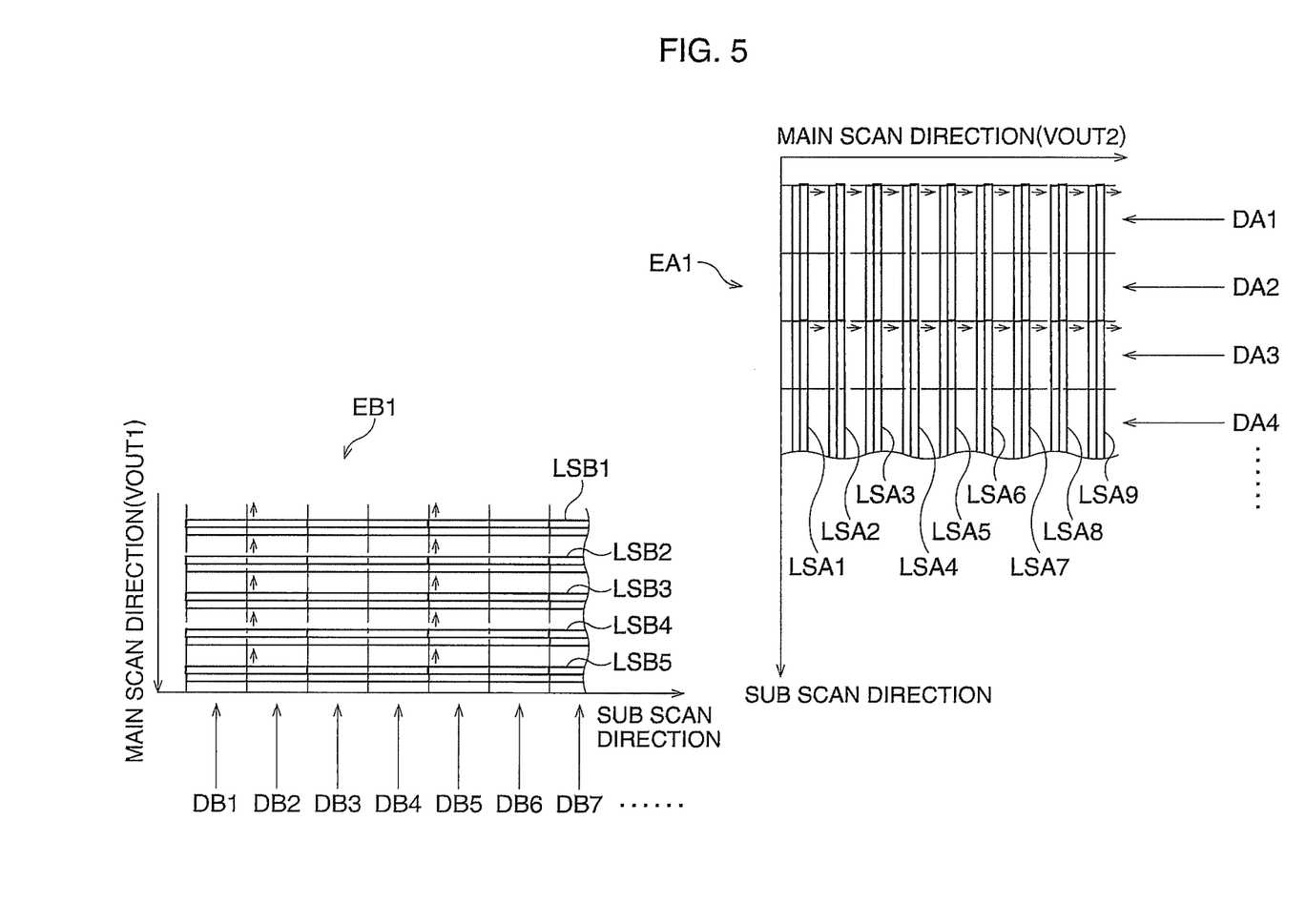
FIG. 5 is a view showing a scanning or reading process of image-pixel signals.

FIG. 5 shows the actual defined distance-measuring zones that correspond to the arrangement of the line sensor groups shown in FIGS. 2 and 3. The scanning directions of the line-sensor group EA1 and the line-sensor group EB1 are also illustrated. The distance-measuring zones DA1, DA2, DA3, DA4, . . . , defined in the line sensor group EA1, are traverse to the line sensors LSA1-LSA9 extending across the left-right direction. On the other hand, the distance-measuring zones DB1, DB2, DB3, DB4, DB5, DB6, DB7, . . . , defined in the line sensor group EB1, are traverse to the line sensors LSB1-LSB5 along the upper-low direction.

In the line sensor group EA1, a main scanning direction is set to the arrangement direction of the line sensors LSA1-LSA9, i.e., in the left-right direction. As described above, each line sensor has a plurality of pairs of photodiodes arranged along the upper-low direction. Electric charges accumulated in the pairs of photodiodes are read across the line sensors LSA1-LSA9 in the main scanning direction, one line by one line. In the case of the line sensor group EB1, the main scanning direction is defined along the upper-low direction. Electric charges accumulated in a plurality of pairs of photodiodes are read across the line sensors LSB1-LSB5 in the main scanning direction, one line by one line. The line sensor groups EA2 and EB2 (not shown in FIG. 5) are also scanned similarly to the line sensor groups EA1 and EB1.

A series of image-pixel signals read by the above scanning method are amplified in the row circuits 45 and 46 shown in FIG. 3. As described above, the threshold value for the AGC circuit is different in each distance-measuring zone. Accordingly, when the gain process is carried out in the row circuits 45 and 46, the value of a gain applied to the image-pixel signals that are read from the line sensors is also different in each distance-measuring zone. Therefore, when a scanned line moves to a next distance-measuring zone, the value of the gain is changed. The amplified image-pixel signals are output to the system control circuit 30 via offset circuits 62 and 64, and switches 66 and 68, respectively. Those series of processes—the accumulation of electric charges and the reading of image-pixel signals—are repeatedly carried out during the AF process.

The system control circuit 30 selectively samples or detects monitor signals from certain AGC circuit elements. A monitor output selection circuit 56 outputs monitor signals designated by the system control circuit 30 to the system control circuit 30 via the switches 66 and 68, respectively. Also, OB monitor signals are output to the system control circuit 30 via a monitor signal selection circuit 52 and the switch 68. The standard voltage level of the monitor signal and the OB monitor signals are shifted or offset by level shift circuits 53 and 55, respectively.

Also, the system control circuit 30 detects the timing of the termination of the accumulation of electric charges. The logic circuit 44 outputs a signal that indicates the termination timing of the accumulation of electric charges for a given line sensor's partial area to the system control circuit 30 via a selection circuit 58. Furthermore, the logic circuit 44 outputs a signal that indicates the termination timing of the accumulation of electric charges for all of the line sensors to the system control circuit 30 via a selection circuit 60. The system control circuit 30 adjusts the period of accumulation of electric charges in each line sensor and a gain value of the AGC circuit on the basis of the above monitor signals and the termination timing signals.

Hereinafter, an image-pixel signal-reading circuit for a line sensor and a monitor sensor is explained with reference to FIGS. 6 and 7.

Figure 6:
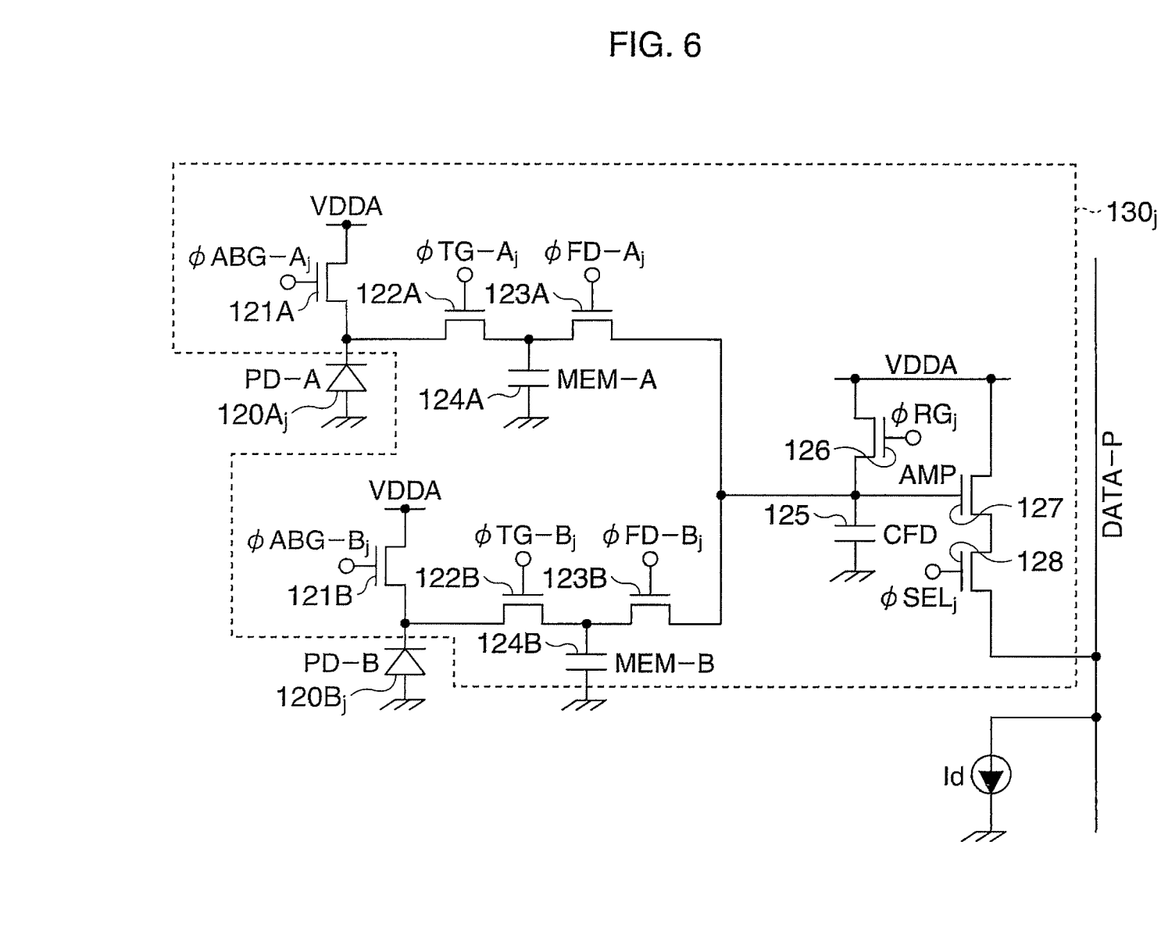
FIG. 6 is a schematic diagram of one image-pixel signal-reading circuit for the line sensor.

FIG. 6 is a schematic diagram of one image-pixel signal-reading circuit for the line sensor (hereinafter, called an "LSR circuit"). FIG. 7 is a schematic diagram of one image-pixel signal-reading circuit for the monitor sensor (hereinafter, called an "MSR circuit").

In FIG. 6, one pair of photodiodes $120A_j$ and $120B_j$ in the line sensor LSB3 are shown in relationship to the LSR circuit $130_j$. Both of the photodiodes $120A_j$ and $120B_j$ are connected to the LSR circuit $130_j$.

The LSR circuit $130_j$ is equipped with anti-blooming gates (ABG) 121A and 121B such as a transistor, transfer gates (TG) 122A and 122B, and capacitors 124A and 124B for storing electric charges temporarily. The transfer gates 122A and 122B transfer electric charges accumulated in the photodiode pair $120A_j$ and $120B_j$ to the capacitors 124A and 124B. Furthermore, the LSR circuit $130_j$ has an electric charge detection mechanism 133 based on FDA (Floating Diffusion Amplifier); namely, floating diffusion gates (FD) 123A and 123B, a floating diffusion capacitor (CFD) 125 for converting an electric charge to a voltage, a reset gate (RG) 126, a source-follower amplifier 127, and a selection gate 128.

Figure 7:
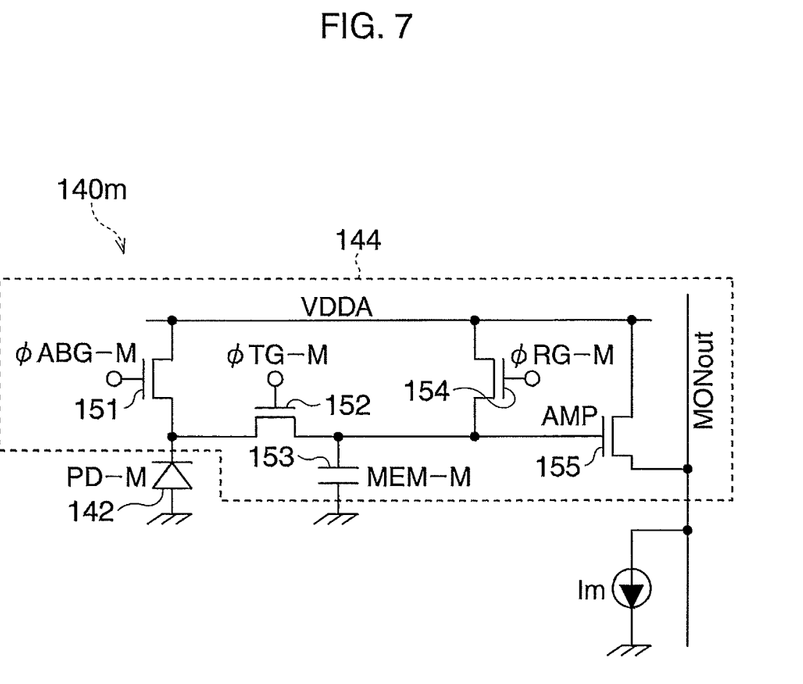
FIG. 7 is a schematic diagram of one image-pixel signal-reading circuit for the monitor sensor.

On the other hand, In the fine photosensor $140_m$ shown in FIG. 7, the photoelectric converter 142 is connected to the MSR circuit (image-pixel signal output circuit for the monitor sensor) 144. The MSR circuit 144 is equipped with an anti-blooming gate (ABG) 151, a transfer gate (TG) 152, a reset gate (RG) 154, a capacitor (MEM) 153, and a source-follower amplifier 155.

In an AF process, electric charges are generated and accumulated in the series of photodiodes $120A_j$ and $120B_j$ of the line sensor LSB3. On the other hand, electric charges generated in the photoelectric converter 142 of the fine photosensor $140_m$ are successively converted to a voltage by the capacitor 153 and transmitted to the AGC circuit (see FIG. 2) via the source-follower amplifier 155.

Herein, the fine photosensor $140_m$ monitors eight pairs of photodiodes to check incident light; i.e., it compares the signal level of electric charges to the threshold value in order to prevent at least one of eight pairs of photodiodes from receiving incident light that exceeds a dynamic range, as described above. The accumulation of electric charges generated in each of the eight pairs of photodiodes continues until the signal level detected by the fine photosensor $140_m$ exceeds the threshold value.

When the signal level exceeds the threshold value, the accumulation of electric charges for all eight pairs of photodiodes is terminated. The accumulated electric charges in the pair of photodiodes $120A_j$ and $120B_j$ are transmitted to the capacitors 124A and 125B, respectively, via the transfer gates 122A and 122B. The transmitted electric charges are temporarily stored in the capacitors 125A and 125B until the accumulation of electric charges for all of the remaining pairs of photodiodes in the other line sensors is terminated. The transfer period of the electric charges is controlled by the logic circuit 44.

When the accumulation of electric charges for every pair of photodiodes is finished, the electric charges stored in the capacitors 124A and 124B are simultaneously transmitted to the floating diffusion capacitor 125 in the LSR circuit $130_j$. Consequently, electric charges generated in the photodiode $120A_j$ and electric charges generated in the photodiode $120B_j$ are mixed together and converted to voltage signals. The voltage signals are amplified by the source-follower amplifier 127 and output to the row circuit 45 or 46.

Next, the reading of image-pixel signals and accumulation of electric charges are explained with reference to FIGS. 8 and 9.

Figure 8A:
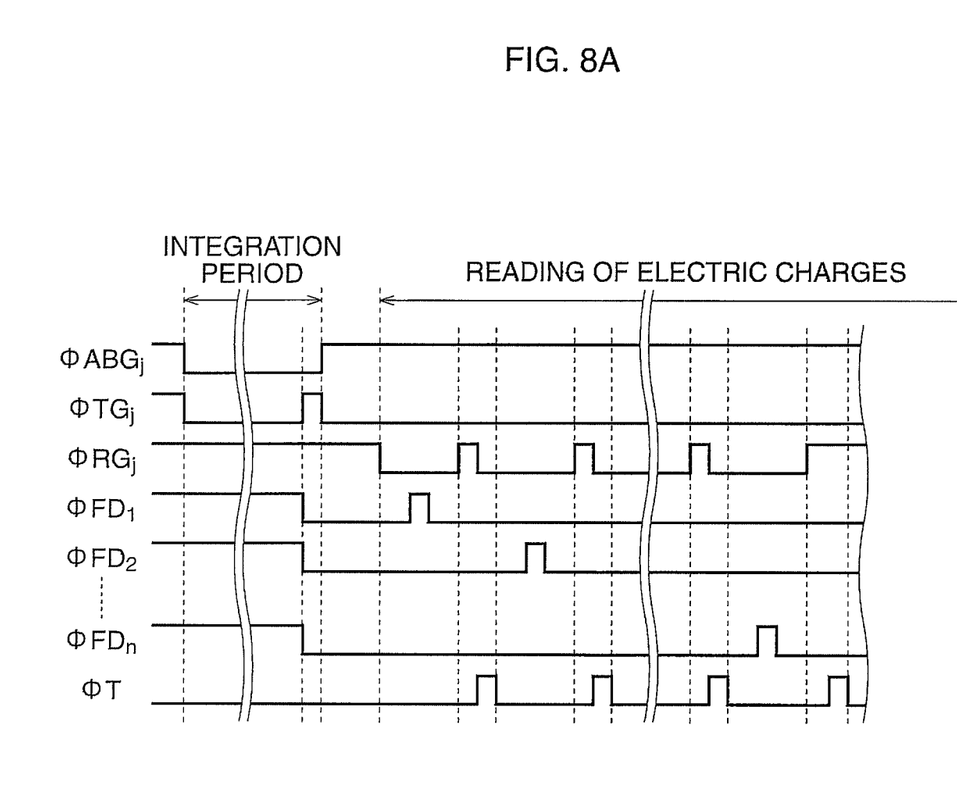
FIGS. 8A and 8B are views showing a timing chart associated with the reading of image-pixel signals and the accumulation of electric charges.
Figure 8B:
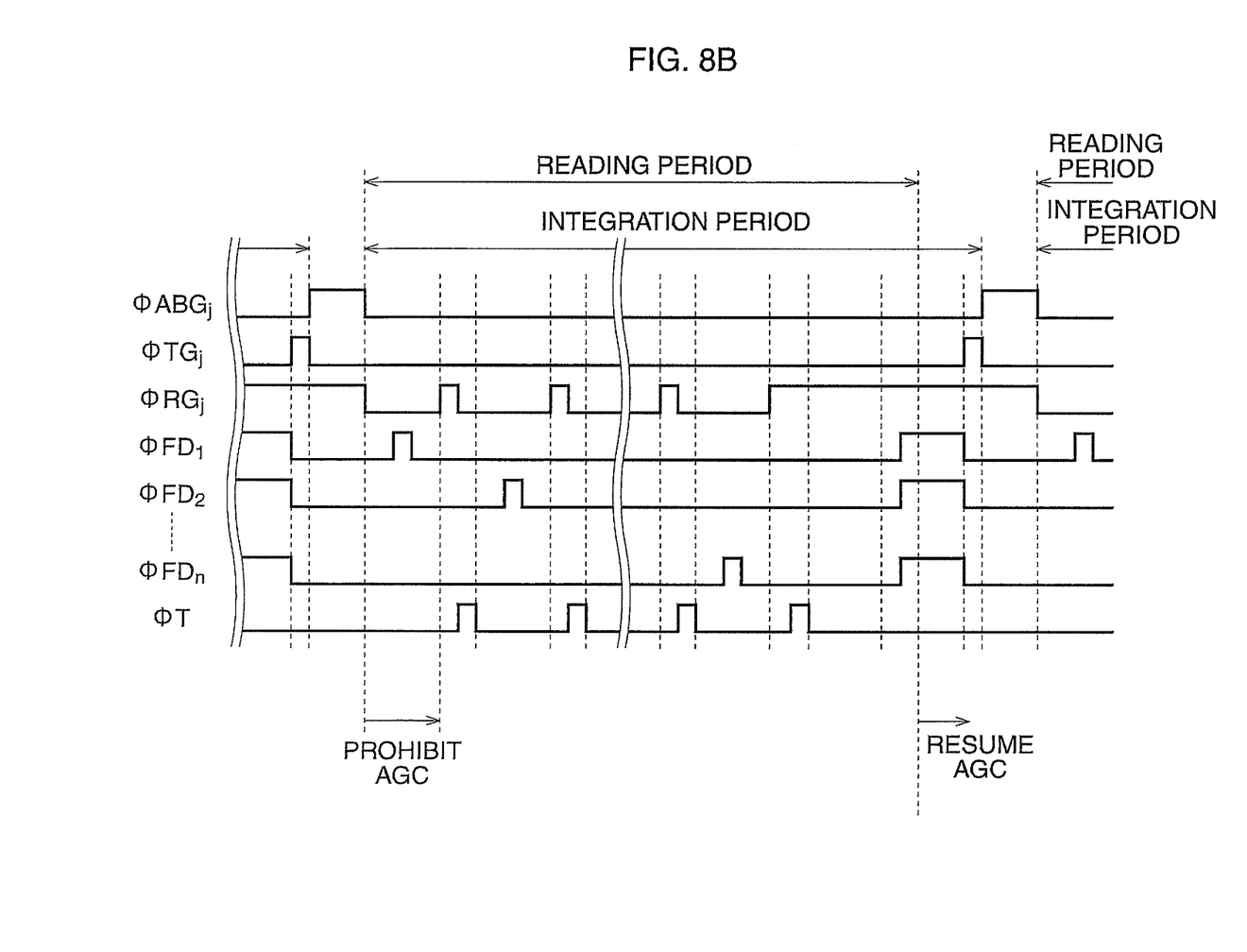

FIGS. 8A and 8B show a timing chart associated with the reading of image-pixel signals and the accumulation of electric charges. Note that floating diffusion gates provided in one line sensor are designated by "$FD_1, FD_2, \ldots, FD_j, \ldots, FD_N$". Also, regarding an anti-blooming gate (ABG), a transfer gate ($TG_j$), and a reset gate ($RG_j$), the same operation for a given pair of photodiodes is also illustrated.

FIG. 8A shows a timing chart of a focus detection procedure in which the accumulation of electric charges and the reading of image-pixel signals are independently carried out in an AF process. After an accumulation of electric charges (integration period) finishes, the reading of electric charges (image-pixel signals) commences. The anti-blooming gate ($ABG_j$) is in the ON state while the image-pixel signals of the entire object image are read.

In FIG. 8B, the timing chart of the focus detection process in which the accumulation of electric charges overlaps with the reading of image-pixel signals. As shown in FIG. 8B, the subsequent accumulation of electric charges starts as the reading of image-pixel signals commences. The anti-blooming gate ($ABG_j$) is turned OFF at the same time as the start of the reading. Furthermore, an operation of the AGC circuit, i.e., a monitor signal-level determination process is prohibited when the reading of image-pixel signals starts. This prevents newly accumulated electric charges from being output via the transfer gate ($TG_j$) while the image-pixel signals are being read.

When the image-pixel signals are read from all of the line sensors, the determination process of the AGC circuit is resumed. Since the accumulation of electric charges was already performed before the determination process restarted, the value of the monitor signal output from the AGC circuit reaches the threshold value earlier than it does in the AF process shown in FIG. 8A. Then, the reading of newly generated image-pixel signals commences soon after the accumulation of electric charges is terminated, and a subsequent accumulation of electric charges starts at the same time. The overlap of the accumulation period and the reading period shortens the time interval for continuously outputting all of the image-pixel signals.

On the other hand, when the brightness of a target object is high, some pairs of photodiodes occasionally become saturated before all of the image-pixel signals are read from the line sensors. In this case, the line sensor having saturated photodiodes and a line sensor within the same distance-measuring zone is not used for detecting an in-focus state, and instead image-pixel signals output from remaining line sensors are used.

Figure 9:
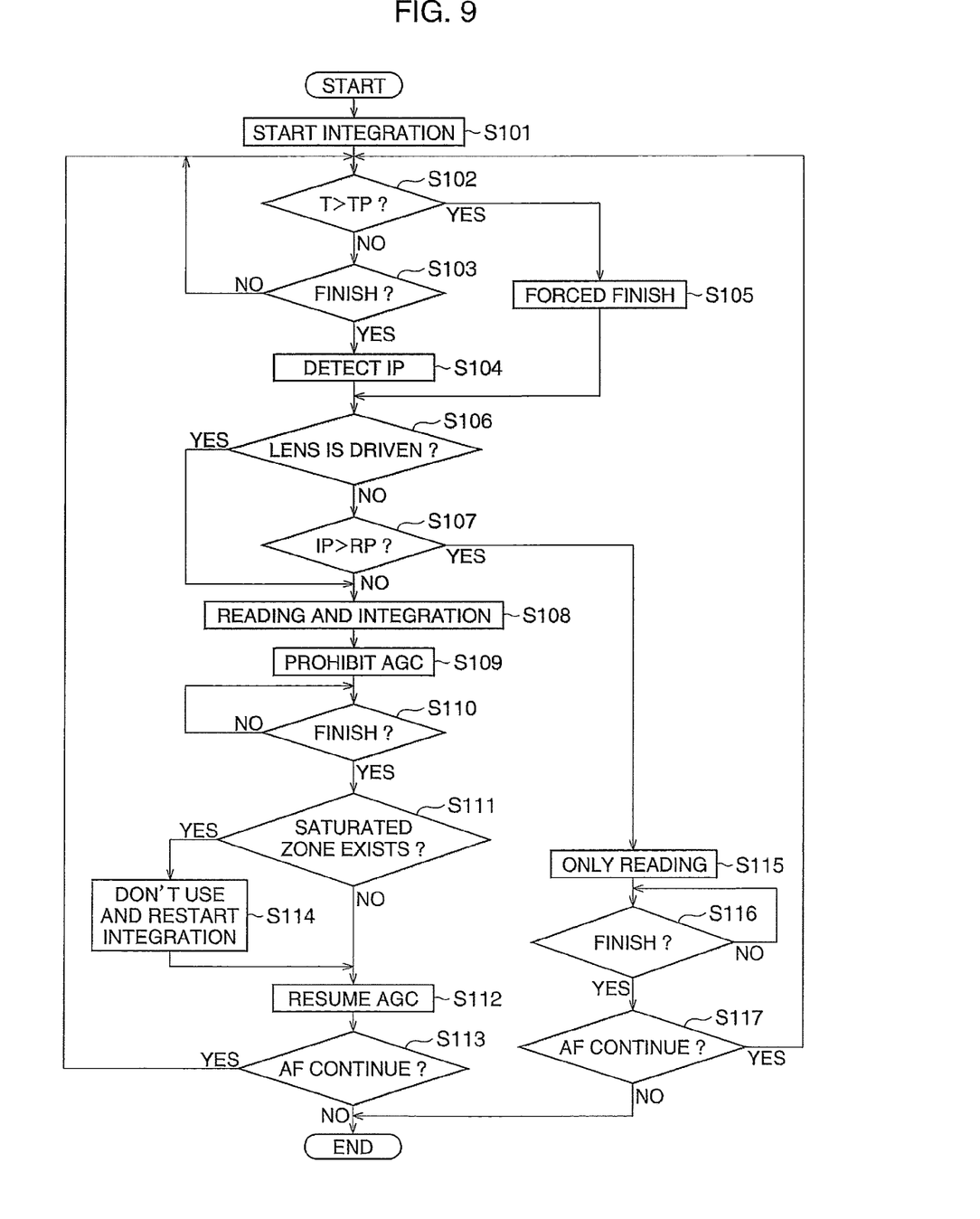
FIG. 9 is a flowchart showing a control of the accumulation of electric charges and the reading of image-pixel signals.

FIG. 9 is a flowchart showing a control for the accumulation of electric charges and the reading of image-pixel signals.

When the release button is depressed halfway, an accumulation of electric charges that does not include reading image-pixel signals commences (S101). In Step S102, it is determined whether a time T from the start of an accumulation of electric charges exceeds a tolerance period TP. The tolerance period TP is predetermined in accordance with the dynamic range of the line sensors.

When it is determined that the time T does not exceed the tolerance period TP, it is determined whether or not the reading of image-pixel signals is complete for all of the line sensors (S103). When it is determined that the reading of image-pixel signals for all of the line sensors has finished, an integration period (IP), i.e., a period of accumulation of electric charges is detected at that time (S104). Concretely, the shortest integration period detected in a line sensor's partial area, which indicates where a monitor signal reaches the threshold level the fastest, is used for the integration period.

On the other hand, when it is determined in Step S102 that the time T has exceeded the tolerance period TP, the accumulation of electric charges for all of the line sensors is forced to finish (S105). In this case, the detected integration period IP is equal to the tolerance period TP.

In Step S106, it is determined whether the focusing lens is driven at present. When it is determined that the focusing lens is not driven, it is determined whether the detected integration period IP exceeds a reference period RP (S107). The reference period RP represents a standard value for determining the brightness level of an object. Note the integration period IP used in Step S106 is a value that was detected in the previous accumulation of electric charges.

When it is determined in Step S107 that the integration period IP does not exceed the reference period RP, it is deemed that the brightness level of the object is relatively high. Then, only the reading of image-pixel signals is carried out (S115). When the reading of image-pixel signals for all of the line sensors finishes, it is determined whether or not the AF process should continue (S117). The process returns to Step S102 when the object image is in-focus.

On the other hand, when it is determined at Step S107 that the integration period IP exceeds the reference period RP, it is deemed that the brightness of the object is relatively low, and the accumulation of electric charges and the reading of image-pixel signals are carried out simultaneously. Also, the operation of the AGC circuit is prohibited once the accumulation of electric charges commences (S109).

Also, when the focusing lens is driven, the accumulation of electric charges starts when the reading of image-pixel signals commences, regardless of the integration period IP (Steps S106 and S108).

When the reading of image-pixel signals for all of the line sensors finishes (S110), it is determined whether or not there exists a distance-measuring zone with a saturated line sensor partial area, namely, the value of the monitor signal from the corresponding fine monitor sensor element exceeds the threshold level (S111). When the saturated line sensor partial area exists, it is determined that image-pixel signals obtained by a line sensor in the distance-measuring zone are not to be used for the in-focus detection process (S114). Also, the accumulation of electric charges is started over again. On the other hand, when the saturated line sensor partial area does not exist, the AGC circuit is resumed (S112). The process returns to Step S102 if the AF process does not finish (S113).

In this way, the focus detector 40 according to the present embodiment has the plurality of line sensors, reads electric charges accumulated in the line sensors, and outputs image-pixel signals. Then, when the brightness level of an object image is equal to or low with respect to a standard brightness level of the object, an accumulation of electric charges starts when the reading of image-pixel signals commences. During the accumulation of electric charges, use of the AGC circuit is prohibited. After the series of image-pixel signals is complete for all of the image sensors, use of the AGC circuit is resumed.

Since the reading of image-pixel signals (electric charges) overlaps the subsequent accumulation of electric charges, the image-pixel signals corresponding to the whole object image can be output in succession at relatively short intervals, which results in a faster AF process speed. Also, when the brightness of an object is relatively high, the accumulation of electric charges does not start until the reading of image-pixel signals finishes. Thus, a saturated line sensor does not occur. On the other hand, when the focusing lens is moving, the accumulation of electric charges starts when reading commences. Thus, the speed of the AF process is enhanced.

As for the timing of the start of the accumulation of electric charges, the start timing may be optionally set to a given timing other than the simultaneous timing. The start timing may be set a given amount of time before the completion of the reading of image-pixel signals for all of the line sensors. Also, the brightness level of an object image may be detected by a method other than the detection of an integration period. Furthermore, an amount of light that the line sensor receives may be detected without a monitor sensor and an AGC circuit.

As for the focus-measurement method, either multiple focal point measurement or center focal point measurement may be applied. The number of line sensors and monitor sensors, or the number of line-sensor groups may be optionally set in accordance with the size and outline of the projection area. The AF module may be installed in another device with a photographing function, such as a cellular phone.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2009-265195 (filed on Nov. 20, 2009), which is expressly incorporated herein by reference, in its entirety.

The invention claimed is:

1. An apparatus for detecting an in-focus state, comprising:
a plurality of line sensors arranged on a projection area of an optical image-forming system;
a plurality of monitor sensors arranged on the projection area, each monitor sensor being adjacent to a corresponding line sensor and monitoring a quantity of light incident on a corresponding line sensor;
an electric charge accumulation controller that controls the timing of the completion of an accumulation of electric charges in said plurality of line sensors on the basis of a monitor signal output from a corresponding monitor sensor, and that controls the timing of the commencement of a subsequent accumulation of electric charges in said plurality of line sensors; and
a signal output processor that reads the accumulated electric charges from said plurality of line sensors and then outputs image signals corresponding to an object image, said electric charge accumulation controller commencing accumulation of electric charges before said signal output processor finishes reading all electric charges in said plurality of line sensors,
wherein said electric charge accumulation controller prohibits performing of a determination process that determines whether the monitor signal exceeds or reaches a threshold level, until the reading of image-pixel signals is finished.

2. The apparatus of claim 1, wherein said electric charge accumulation controller commences the accumulation when the brightness of an object is less than or equal to a predetermined level.

3. The apparatus of claim 1, wherein said electric charge accumulation controller commences accumulation when a period for accumulating electric charges is longer than a period for reading the accumulated electric charges.

4. The apparatus of claim 1, wherein said electric charge accumulation controller commences the accumulation while driving a focusing lens.

5. The apparatus of claim 1, wherein electric charges accumulated in a saturated line sensor are not used in focus detection.

6. The apparatus of claim 1, wherein a series of distance-measuring zones is defined on the projection area and electric charges accumulated in a line sensor within a distance-measuring zone containing the saturated line sensor are not being used in the focus detection.

7. The apparatus of claim 1, wherein said electric charge accumulation controller commences the accumulation when the reading of the accumulated electric charges is commenced.

8. A camera comprising:
a photographing optical system that forms an object image on an image sensor:
an apparatus for detecting an in-focus state in accordance with claim 1, said apparatus generating and outputting image signals on the basis of light passing through said photographing optical system; and
an AF adjuster that brings an object image into focus by driving a focusing lens in said photographing optical system on the basis of image signals output from the apparatus.

9. An apparatus for detecting an in-focus state, comprising:
a plurality of line sensors arranged on a projection area of an optical image-forming system;
an electric charge accumulation controller that controls the timing of the completion of an accumulation of electric charges in said plurality of line sensors, and that controls the timing of the commencement of a subsequent accumulation of electric charges in said plurality of line sensors; and
a signal output processor that reads the accumulated electric charges from said plurality of line sensors and then outputs image signals corresponding to an object image, said electric charge accumulation controller commencing accumulation of electric charges before said signal output processor finishes reading all electric charges in said plurality of line sensors,
wherein said electric charge accumulation controller prohibits performing of a determination process that determines whether a monitor signal, which monitors a quantity of light incident on a corresponding line sensor of the plurality of line sensors, exceeds or reaches a threshold level, until the reading of image-pixel signals is finished.

* * * * *